(12) United States Patent
Xiong et al.

(10) Patent No.: US 9,726,921 B2
(45) Date of Patent: Aug. 8, 2017

(54) LIQUID CRYSTAL DISPLAY MODULE AND MOBILE DEVICE

(71) Applicant: Xiaomi Inc., Beijing (CN)

(72) Inventors: Tao Xiong, Beijing (CN); Zhuxin Li, Beijing (CN); Kesheng Yan, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/013,724

(22) Filed: Feb. 2, 2016

(65) Prior Publication Data

US 2016/0363802 A1    Dec. 15, 2016

(30) Foreign Application Priority Data

Jun. 9, 2015 (CN) .......................... 2015 1 0314002

(51) Int. Cl.
| | | |
|---|---|---|
| *G02F 1/1333* | (2006.01) | |
| *G02F 1/1335* | (2006.01) | |
| *G02F 1/133* | (2006.01) | |
| *H04M 1/02* | (2006.01) | |
| *H04M 1/03* | (2006.01) | |

(52) U.S. Cl.
CPC .... *G02F 1/133308* (2013.01); *G02F 1/13306* (2013.01); *G02F 1/133528* (2013.01); *H04M 1/0266* (2013.01); *H04M 1/03* (2013.01); *G02F 2001/133317* (2013.01); *G02F 2001/133322* (2013.01); *G02F 2001/133325* (2013.01); *G02F 2001/133331* (2013.01)

(58) Field of Classification Search
CPC ........... G02F 1/133308; G02F 1/13306; G02F 1/133528
See application file for complete search history.

(56) References Cited

U.S. PATENT DOCUMENTS

| | | |
|---|---|---|
| 2012/0098791 A1 | 4/2012 | Hamada et al. |
| 2013/0113733 A1 | 5/2013 | Lim et al. |
| 2014/0211431 A1 | 7/2014 | Um et al. |

FOREIGN PATENT DOCUMENTS

| | | |
|---|---|---|
| CN | 101097328 A | 1/2008 |
| CN | 103971602 A | 8/2014 |
| EP | 2 527 911 A1 | 11/2012 |
| JP | 2008-026584 A | 2/2008 |
| JP | 2015-079095 A | 4/2015 |
| KR | 10-2011-0103729 A | 9/2011 |
| KR | 10-2014-0009953 A | 1/2014 |

(Continued)

OTHER PUBLICATIONS

Extended European Search Report dated Feb. 10, 2016 for European Application No. 15194564.9, 9 pages.

(Continued)

*Primary Examiner* — Joseph L Williams
(74) *Attorney, Agent, or Firm* — Brinks, Gilson & Lione

(57) ABSTRACT

A liquid crystal display module and a mobile device are provided. The liquid crystal display module includes: a display function component and a cover glass structure. The display function component is disposed in a receiving space of a middle-frame structure of a mobile device. The cover glass structure includes a front glass structure directly disposed on the display function component. A dimension of the front glass structure matches with the middle-frame structure and the cover glass structure covers a majority of an upper surface of the mobile device.

18 Claims, 5 Drawing Sheets

(56) References Cited

FOREIGN PATENT DOCUMENTS

| | | |
|---|---|---|
| KR | 10-2015-0015243 A | 2/2015 |
| KR | 10-2015-0058669 A | 5/2015 |
| RU | 2 269 807 C2 | 2/2006 |

OTHER PUBLICATIONS

International Search Report dated Feb. 18, 2016 for International Application No. PCT/CN2015/090245, 5 pages.
Office Action dated Mar. 1, 2017 for Russian Application No. 2015151766/08, 11 pages.

LIQUID CRYSTAL DISPLAY MODULE AND MOBILE DEVICE

CROSS-REFERENCE TO RELATED APPLICATION

This application is based upon and claims priority to Chinese Patent Application No. 201510314002.2, filed Jun. 9, 2015, the entire contents of which are incorporated herein by reference.

TECHNICAL FIELD

The present disclosure relates to the technical field of terminal and, more particularly, to a liquid crystal display module and a mobile device.

BACKGROUND

With the increasing development of technology and science, various types of mobile devices such as smartphones and tablet computers have been integrated into daily life and work of users. According to the portable requirements to mobile devices for users without simultaneously affecting the display effect of mobile devices, the size of mobile devices are being reduced by manufacturers through various methods under the circumstance of constant screen size of mobile devices.

SUMMARY

The present disclosure provides a liquid crystal display module and a mobile device.

According to a first aspect of the present disclosure, there is provided a liquid crystal display module. The liquid crystal display module includes: a display function component and a cover glass structure. The display function component is disposed in a receiving space of a middle-frame structure of a mobile device. The cover glass structure includes a front glass structure directly disposed on the display function component. A dimension of the front glass structure matches with the middle-frame structure and the cover glass structure covers a majority of an upper surface of the mobile device.

According to a second aspect of the present disclosure, there is provided a mobile device that includes: the liquid crystal display modules according to the above embodiment.

According to a third aspect of the present disclosure, a method is provided for assembling the mobile device. The method includes: assembling a liquid crystal display module and a middle-frame structure, the liquid crystal display module comprising a display function component; disposing the display function component in a receiving space of a middle-frame; disposing a front glass structure directly on the display function component, wherein a dimension of the front glass structure matches with the middle-frame structure; and forming a cover glass structure of a mobile device by the front glass structure after the liquid crystal display module and the middle-frame structure of the mobile device have been assembled.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Figure 1:
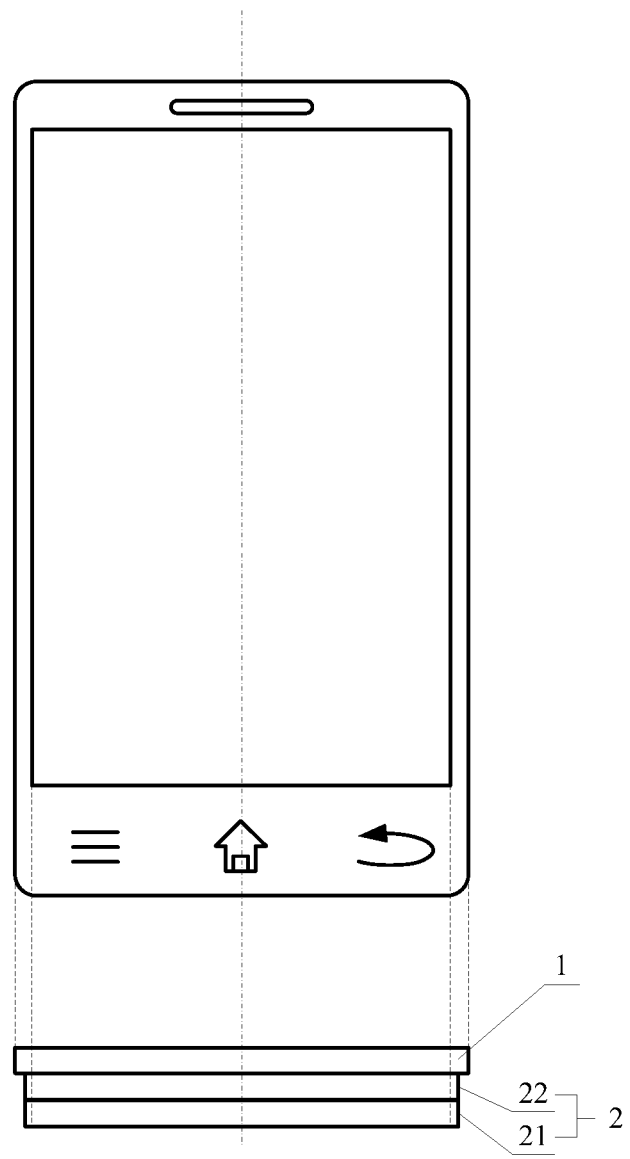
FIG. 1 is a structural schematic diagram of a mobile device in the related technology.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may include used herein to describe various information, the information should not be limited by these terms. These terms are only used to distinguish one category of information from another. For example, without departing from the scope of the present disclosure, first information may include termed as second information; and similarly, second information may also be termed as first information. As used herein, the term "if" may include understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may include combined in any suitable manner.

The solutions provided by embodiments of the present disclosure may include the following advantageous effects: the cover glass structure of the mobile device can be replaced by adjusting the front glass structure in the liquid crystal display module in the present disclosure, so as to omit adhering between the liquid crystal display module and the cover glass structure at the same time of simplifying structure of the mobile device. Therefore, there is no need to consider the matter of manufacturing tolerance caused by adhering, so as to facilitate the size reducing of the mobile device and to achieve narrow rim effect.

FIG. 1 is a structural schematic diagram of a mobile device in the related technology. As shown in FIG. 1, in the related technology, a cover glass structure 1 is arranged on a front surface of the mobile device (or regarded as a top surface), so that users can directly touch the cover glass structure 1 at the front surface of the mobile device. While a liquid crystal display module (LCM) 2 is arranged on the rear (or regarded as bottom) of the cover glass structure 1, in order to achieve such functions as display and touch control of the mobile device. As shown in FIG. 1, the cover glass structure 1 is aligned with sides of the mobile device (or is slightly narrower than the sides), while the liquid crystal display module 2 is slightly broader than an active area (AA) on the mobile device based on structure, manufacturing process and other reasons.

Among others, the liquid crystal display module 2 may be divided into a display function component 21 and a front glass structure 22. The front glass structure 22 is assembled into a middle-frame structure 3 (see FIG. 3) of the mobile device after the front glass structure has been adhered (directly, or probably with other structures such as a front polarizer therebetween) with the cover glass structure 1.

However, the liquid crystal display module 2 and the cover glass structure 1 are normally manufactured by different manufacturers, and then adhered and assembled by other manufacturers, which can causes the matter of the symmetry axis of the liquid crystal display module 2 and the cover glass structure 1 to be misaligned, i.e. outside existing assembly tolerance. Therefore, in order to allow the assembly tolerance in the related technology, it is necessary to provide a corresponding reserved space inside the middle-frame structure 3 for accommodating the assembly tolerance. However, the assembly tolerance is generally up to approximately 0.3 mm, which seriously affects the development trend of narrow rim, lightness and thinness of the mobile device.

Therefore, the present disclosure solves the above technical problem of the related technology by improving the structure of the liquid crystal display module 2.

Figure 2:
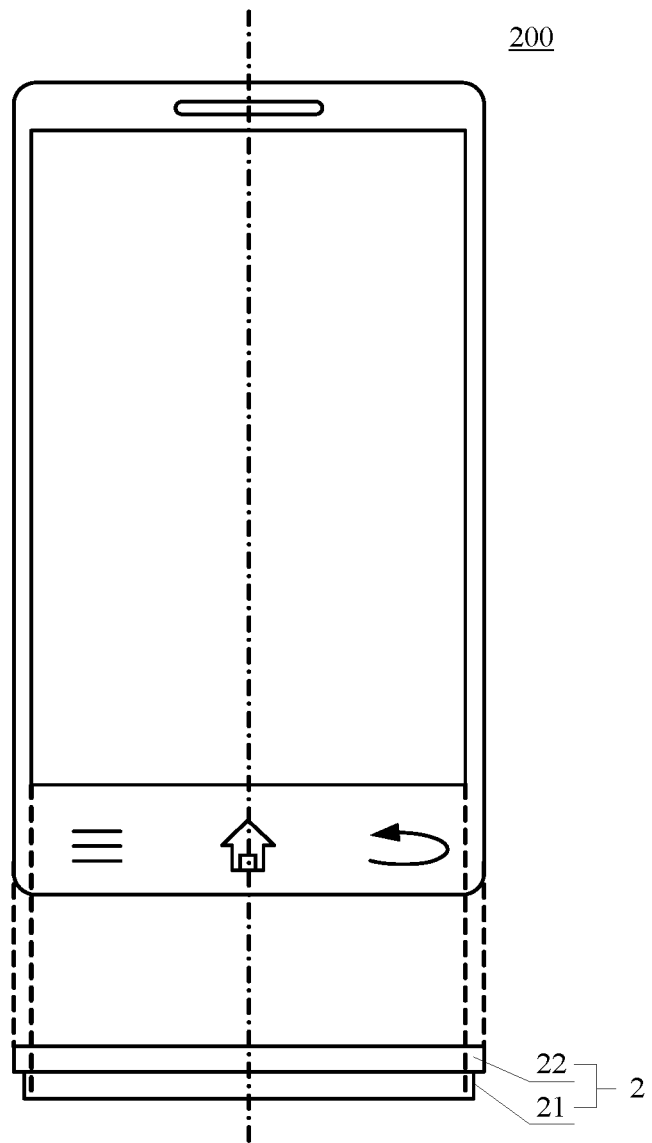
FIG. 2 is a structural schematic diagram of a mobile device according to one exemplary embodiment.
Figure 3:
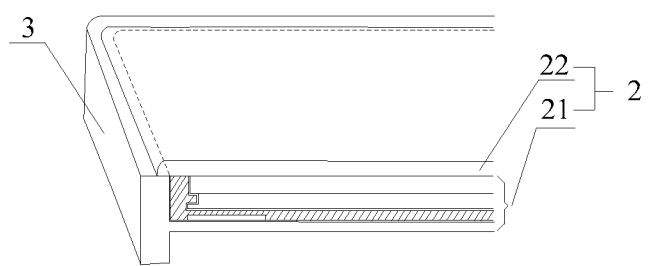
FIG. 3 is a structural schematic diagram of assembling a liquid crystal display module and middle-frame structure according to one exemplary embodiment.

FIG. 2 is a structural schematic diagram of a mobile device 200 according to one exemplary embodiment. FIG. 3 is a structural schematic diagram of assembling a liquid crystal display module and middle-frame structure according to one exemplary embodiment. As shown in FIGS. 2 and 3, the liquid crystal display module 2 may include: a display function component 21 and a front glass structure 22.

The display function component 21 is disposed in a receiving space of the middle-frame structure 3 after the display crystal display module 2 and the middle-frame structure 3 of the mobile device have been assembled; and The front glass structure 22 is fixedly arranged above the display function component 21, where the dimension of the front glass structure 22 is matched with the middle-frame structure 3 so that a cover glass structure of the mobile device is formed by the front glass structure 22 after the liquid crystal display module 2 and the middle-frame structure 3 of the mobile device have been assembled. The cover glass structure 22 covers a majority of an upper surface of the mobile device 200.

In the present embodiment, with improving the structure of the liquid crystal display module 2, i.e. matching the dimension of the front glass structure 22 with the middle-frame structure 3, the cover glass structure 1 of FIG. 1 may be replaced by the front glass structure 22, thereby achieving the relevant functions. By replacing the cover glass structure 1 with the front glass structure 22, a step of adhering between the liquid crystal display module 2 and the cover glass structure 1 may be omitted in the assembly process of the mobile device, which is helpful to simplify the assembly procedure of the mobile device, and also can avoid manufacturing tolerance caused by adhering between the liquid crystal display module 2 and the cover glass structure 1. Further, there is no need to provide a reserved space for receiving the manufacturing tolerance, which is helpful to achieve development of narrow rim structure, lightness and thinness of the mobile device.

1. Adhering Assembly

The liquid crystal display module 2 may be fixedly connected with the middle-frame structure 3 in an adhering way. As one exemplary embodiment, as shown in FIG. 3, the middle-frame structure 3 includes a side rim constituting sides of the mobile device, so that edges of the front glass structure 22 are adhered with the middle-frame structure 3 at the side rim. Of course, the above way is only used for example explanation, and other ways such as adhering between the display function component 21 and an inside wall of side rim of the middle-frame structure 3 may obviously be adopted. Similarly, the adhering ways between the cover glass structure 1 and the middle-frame structure 3, or between the liquid crystal display module 2 and the middle-frame structure 3 in the related technology may be applied to the adhering operation between the liquid crystal display module 2 and the middle-frame structure 3, which is not limited in the present disclosure.

2. Bottom Groove

Figure 4:
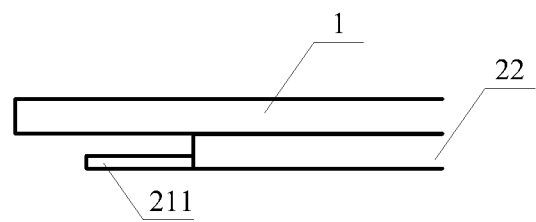
FIG. 4 is a structural schematic diagram of a mobile device in the related technology.

FIG. 4 is a structural schematic diagram of a mobile device in the related technology. As shown in FIG. 4, the dimension of the front glass structure 22 in the related technology is smaller than the cover glass structure 1, so the front glass structure 22 and a chip structure 211 of the display function component 21 are adjacent arranged, while the chip structure 211 is positioned at the space surrounded between bottom of the cover glass structure 1 and left-side wall of the front glass structure 22, like that in FIG. 4.

Figure 5A:
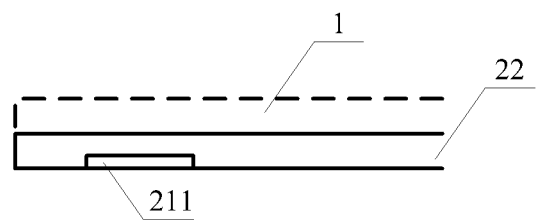
FIG. 5A is a structural schematic diagram of a liquid crystal display module according to one exemplary embodiment.

FIG. 5A is a structural schematic diagram of a liquid crystal display module according to one exemplary embodiment.

Figure 5B:
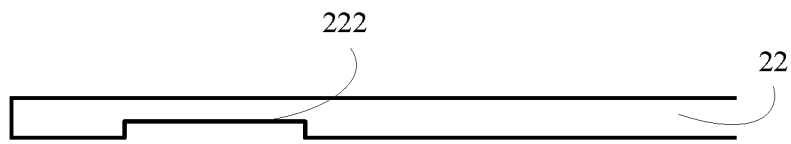
FIG. 5B illustrates a structural schematic diagram of a partial front glass structure in the liquid crystal display module shown in FIG. 5A.

FIG. 5B illustrates a structural schematic diagram of a partial front glass structure in the liquid crystal display module shown in FIG. 5A. After the dimension of the front glass structure 22 is changed to replace the cover glass, the original space for positioning the chip structure 211 is occupied by the front glass structure 22. Therefore, as shown in FIG. 5B, a back of the front glass structure 22 includes a groove 222, whose position and dimension are matched with a chip structure 211 in FIG. 5A, so as to locate the chip structure 211 within a receiving space of the groove. In the embodiment, the chip structure 211 may be arranged at the same position as that in the related technology by arranging the groove at a back of the chip structure 211. It will not occupy other spaces inside the mobile device, which facilitates internal space planning and utilizing of the mobile device and helps to achieve designs of narrow rim structure, lightness and thinness of the mobile device. Because the chip structure 211 may have different dimensions, the front glass structure 22 may include corresponding structure to accommodate the chip structure 211. In other words, the groove 222 is just for illustration and the front glass structure 22 may include other shapes of cavity structure that matches the chip structure 211.

3. Thickness Increasing

In the related technology, the front glass structure 22 and the cover glass structure 1 are both arranged inside the mobile device. Further, High strength requirements such as beat-resisting, wear-resisting are satisfied by the cover glass structure 1. However in order to help the lightness and thinness design of the mobile device, the thickness of the front glass structure 22 must be reduced as much as possible, so that the thickness of the front glass structure 22 is merely about 0.15 mm.

Figure 6:
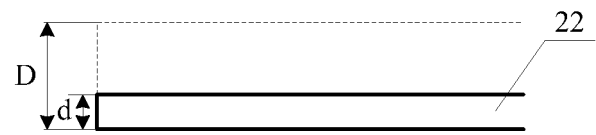
FIG. 6 is a structural schematic diagram of a front glass structure on the liquid crystal display module according to one exemplary embodiment.

In the present embodiment, due to removing of the cover glass structure 1 (or the front glass structure 22 performing the function of the original cover glass structure 1), the shock initially exerted on the cover glass structure 1 needs to be resisted by the front glass structure 22, thereby the thickness of the front glass structure 22 should be increased so as not to be smaller than a predetermined thickness. The predetermined thickness may be at least 0.4 mm. For example, as shown in FIG. 6, the thickness of the front glass structure 22 may be increased from the original d to D, so that strength of the front glass structure 22 could reach the predetermined strength. The front glass structure may withstand the pressure from an external object such as finger, a pen, etc. For example, the predetermined strength may be 1000 MPa, 1200 MPa, or higher.

Moreover, with respect to the active area corresponding to the display function component 21, a front polarizer structure (not shown in the figures) in the display function component 21 is formed by sputtering with vacuum coating process at a place of a back surface of the front glass structure corresponding to the active area. As the front polarizer structure may be adhered between the front glass structure 22 and the cover glass structure 1 in the related technology, matters such as scratching the front polarizer structure during the usage of the mobile device may be avoided by forming the front polarizer structure to a back of the front glass structure 22 under condition of removing the cover glass structure 1, thereby it is helpful to extend service life of the liquid crystal display module 2.

Simultaneously, as optical properties such as transmittance may be changed after the thickness of the front glass structure 22 has been increased, the optical properties may be improved to obtain better lighting effects after the front glass structure 22 has been processed by vacuum coating process discussed above. Of course, except from forming the front polarizer structure by sputtering, the front glass structure 22 may be further processed with vacuum coating process to obtain final desired optical property.

4. Other Processes

Figure 7:
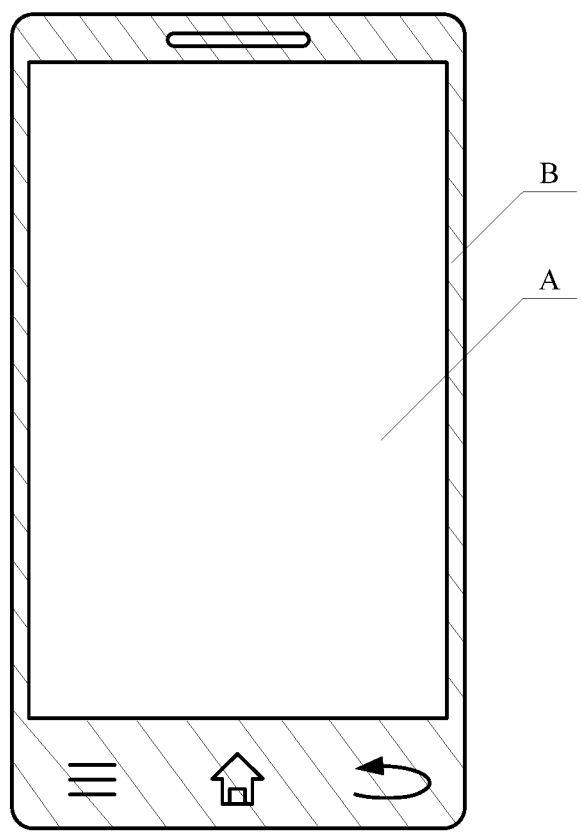
FIG. 7 is a structural schematic diagram of another mobile device according to one exemplary embodiment.

As shown in FIG. 7, area A is the active area of the mobile device; while area B outside the area A is the non-active area.

As one exemplary embodiment, a protection ink layer (not shown in the figures) is arranged at a place of a back of the front glass structure 22 corresponding to the non-active area, thereby avoiding users directly observing the inner structure of the mobile device from relevant areas. Here, the protection ink layer may be formed by silk printing process.

As another exemplary embodiment, a display control circuit (not shown in the figures) is arranged at a place of a back of the front glass structure 22 corresponding to the non-active area, thereby transferring touch signals and others collected by the liquid crystal display module 2. Here, the display control circuit is formed by photolithography process.

Of course, in the embodiment of the present disclosure, the front glass structure 22 may include both protection ink layer and display control circuit discussed above.

The present disclosure also provides a mobile device, including any one of the liquid crystal display modules 2 in the above embodiments.

Figure 8:
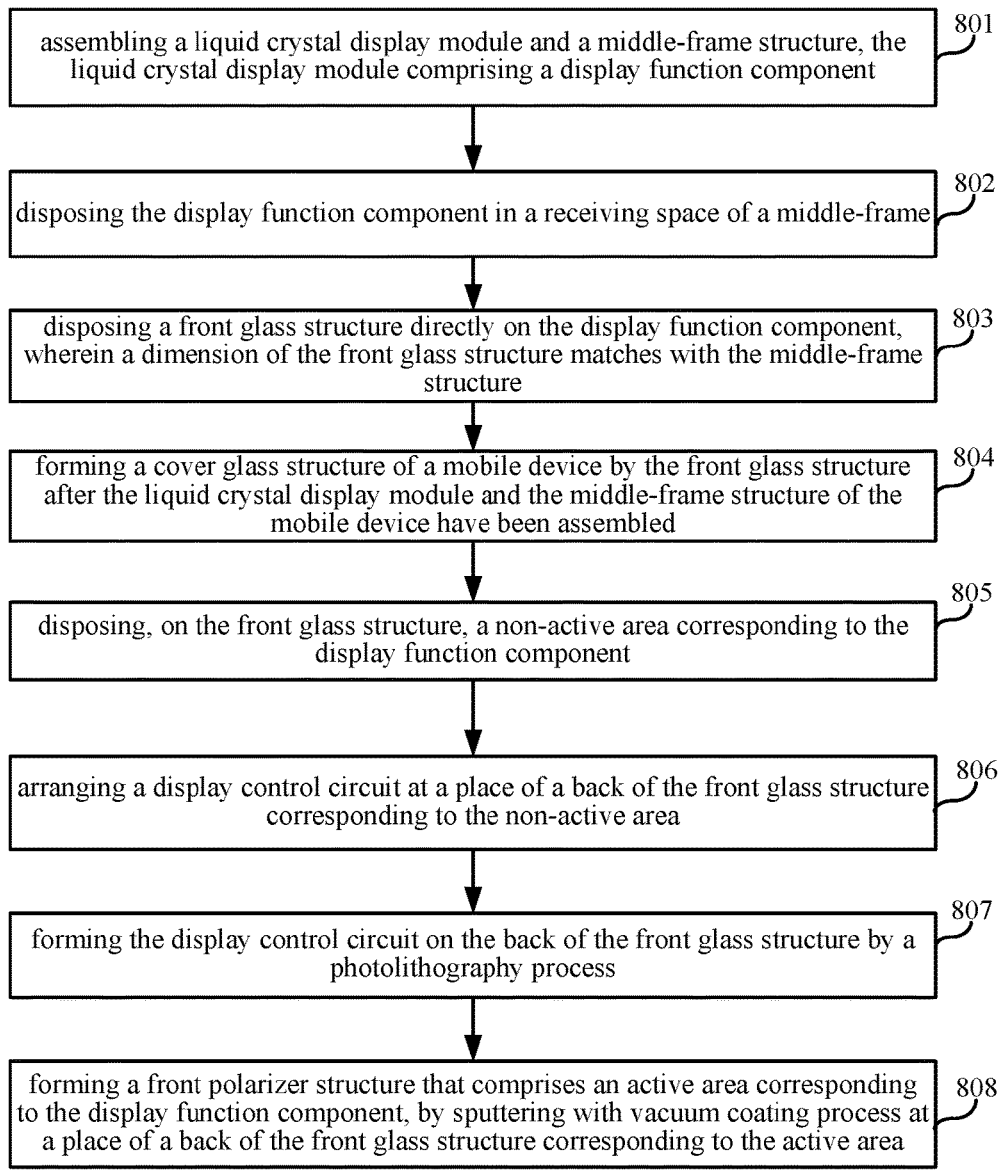
FIG. 8 is an example flow chart according to one exemplary embodiment.

As shown in FIG. 8, a method to assemble the mobile device includes following steps. In step 801, assembling a liquid crystal display module and a middle-frame structure, the liquid crystal display module comprising a display function component. In step 802, disposing the display function component in a receiving space of a middle-frame. In step 803, disposing a front glass structure directly on the display function component, where a dimension of the front glass structure matches with the middle-frame structure. In step 804, forming a cover glass structure of a mobile device by the front glass structure after the liquid crystal display module and the middle-frame structure of the mobile device have been assembled.

The method may further include steps 805 to 808. In step 805, disposing, on the front glass structure, a non-active area corresponding to the display function component. In step 806, arranging a display control circuit at a place of a back of the front glass structure corresponding to the non-active area. In step 807, the display control circuit is formed on the back of the front glass structure by a photolithography process. In step 808, forming a front polarizer structure that comprises an active area corresponding to the display function component, by sputtering with vacuum coating process at a place of a back of the front glass structure corresponding to the active area In the disclosure, a liquid crystal display module includes: a display function component and a front glass structure. The display function component may be disposed in a receiving space of a middle-frame structure of a mobile device, where the liquid crystal display module and the middle-frame structure are assembled together in the mobile device. The front glass structure is fixedly arranged above the display function component, where a dimension of the front glass structure matches with the middle-frame structure and the cover glass structure covers a majority of an upper surface of the mobile device.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof It is intended that the scope of the invention should only be limited by the appended claims.

What is claimed is:

1. A liquid crystal display module for a mobile device, comprising:
   a display function component disposed in a receiving space of a middle-frame structure of the mobile device and abutting an internal side rim wall of the middle-frame structure; and
   a cover glass structure comprising a front glass structure, the front glass structure directly disposed on the display function component and sized to sit, at least in part, on a top surface of the middle-frame structure, wherein the cover glass structure covers a majority of an upper surface of the mobile device.

2. The module according to claim 1, wherein a thickness of the front glass structure is not smaller than a predetermined thickness so as to make a strength of the front glass structure reaches a predetermined strength.

3. The module according to claim 1, wherein the front glass structure comprises a non-active area corresponding to the display function component.

4. The module according to claim 3, wherein a protection ink layer is arranged at a place of a back of the front glass structure corresponding to the non-active area.

5. The module according to claim 1, wherein the front glass structure comprises a non-active area corresponding to the display function component; and wherein a display control circuit is arranged at a place of a back of the front glass structure corresponding to the non-active area.

6. The module according to claim 1, wherein the display function component comprises:
   a front polarizer structure, wherein the front glass structure comprises an active area corresponding to the display function component, and the front polarizer structure is formed by sputtering with vacuum coating process at a place of a back of the front glass structure corresponding to the active area.

7. The module according to claim 1, wherein a back of the front glass structure corresponding to a non-active area of the display function component comprises a groove structurally dimensioned to receive a chip structure on the display function component, and the front glass structure further comprises an edge portion along a periphery of the front glass structure, the edge portion having a thickness greater than the groove and also corresponding to the non-active area of the display function component.

8. A mobile device, comprising:
   a liquid crystal display module comprising:
   a display function component disposed in a receiving space of a middle-frame structure of the mobile device and abutting an internal side rim wall of the middle-frame structure, wherein the liquid crystal display module and the middle-frame structure are assembled together in the mobile device; and
   a front glass structure fixedly arranged above the display function component and sized to sit, at least in part, on a top surface of the middle-frame structure, wherein the front glass structure serves as a cover glass structure of the mobile device.

9. The mobile device according to claim 8, wherein a thickness of the front glass structure is not smaller than a predetermined thickness so as to make the strength of the front glass structure reaches a predetermined strength.

10. The mobile device according to claim 8, wherein the front glass structure comprises a non-active area corresponding to the display function component.

11. The mobile device according to claim 10, wherein a protection ink layer is arranged at a place of a back of the front glass structure corresponding to the non-active area.

12. The mobile device according to claim 8, wherein the front glass structure comprises a non-active area corresponding to the display function component; and wherein a display control circuit is arranged at a place of a back of the front glass structure corresponding to the non-active area.

13. The mobile device according to claim 8, wherein the display function component comprises:
   a front polarizer structure, wherein the front glass structure comprises an active area corresponding to the display function component, and the front polarizer structure is formed by sputtering with vacuum coating process at a place of a back of the front glass structure corresponding to the active area.

14. The mobile device according to claim 8 wherein a back of the front glass structure corresponding to a non-active area of the display function component comprises a groove structurally dimensioned to receive a chip structure on the display function component, and wherein the front glass structure further comprises an edge portion along a periphery of the front glass structure, the edge portion having a thickness greater than the groove and also corresponding to the non-active area of the display function component.

15. A method, comprising:
   assembling a liquid crystal display module and a middle-frame structure, the liquid crystal display module comprising a display function component;
   disposing the display function component in a receiving space of a middle-frame structure to abut an internal side rim wall of the middle-frame structure;
   disposing a front glass structure directly on the display function component and sized to sit, at least in part, on a top surface of the middle-frame structure; and
   forming a cover glass structure of a mobile device by the front glass structure after the liquid crystal display module and the middle-frame structure of the mobile device have been assembled.

16. The method according to claim 15, wherein disposing the front glass structure comprises:
   disposing the front glass structure to include a groove along a back of the front glass structure facing the display function component, the groove aligned and structurally dimensioned to receive a display control circuit on the display function component;
   disposing the front glass structure to include an edge portion along a periphery of the front glass structure, the edge portion having a thickness greater than the groove and also corresponding to the non-active area of the display function component; and
   wherein the groove and edge portion are positioned to correspond to a non-active area of the display function component.

17. The method according to claim 16, further comprising:
   forming the display control circuit on the back of the front glass structure by a photolithography process.

18. The method according to claim 17, further comprising:
   forming a front polarizer structure that comprises an active area corresponding to the display function component, by sputtering with vacuum coating process at a place of a back of the front glass structure corresponding to the active area.

* * * * *